(12) United States Patent
Charles, Sr.

(10) Patent No.: US 6,511,079 B1
(45) Date of Patent: Jan. 28, 2003

(54) CONVERTIBLE SNOW CYCLE/BICYCLE APPARATUS

(76) Inventor: Leroy R. Charles, Sr., 102 Eastern Ave., Rochester, NH (US) 03867-2001

( * ) Notice: Subject to any disclaimer, the term of this patent is extended or adjusted under 35 U.S.C. 154(b) by 0 days.

(21) Appl. No.: 09/822,074

(22) Filed: Mar. 30, 2001

(51) Int. Cl.⁷ .............................. B62B 9/04; B62B 15/00
(52) U.S. Cl. ..................... 280/12.14; 280/12.1; 280/13; 180/190
(58) Field of Search .......................... 280/12.14, 12.13, 280/12.12, 12.11, 12.1, 13, 283, 284, 7.14, 7.12; 180/190, 193

(56) References Cited

U.S. PATENT DOCUMENTS

| | | | |
|---|---|---|---|
| 756,767 A | * | 4/1904 | Youngken .................. 280/12.1 |
| 1,221,898 A | | 4/1917 | Palm |
| 1,225,529 A | * | 5/1917 | Tubbs ..................... 280/12.14 |
| 1,261,204 A | * | 4/1918 | Barton .................... 280/12.14 |
| 1,318,166 A | * | 10/1919 | Matheus ................... 280/12.1 |
| 3,412,821 A | | 11/1968 | Humphrey |
| 3,915,468 A | * | 10/1975 | Hoareau .................... 280/12.1 |
| 5,102,153 A | | 4/1992 | Rhode |
| D329,625 S | | 9/1992 | Muller et al. |
| 5,423,559 A | | 6/1995 | Rhode |
| 5,738,361 A | | 4/1998 | Landucci |
| 6,164,670 A | * | 12/2000 | Abarca et al. .......... 280/12.14 |
| 6,279,923 B1 | * | 8/2001 | Cardillo, Jr. et al. .... 280/12.14 |

FOREIGN PATENT DOCUMENTS

FR 2556303 * 12/1983 ................ 280/7.14

* cited by examiner

Primary Examiner—Brian L. Johnson
Assistant Examiner—Haij Phan

(57) ABSTRACT

A convertible snow cycle/bicycle apparatus for providing a vehicle which can be used all year long. The convertible snow cycle/bicycle apparatus includes a frame including a front portion and a rear portion; and also includes a steering assembly being attached to the front portion of the frame; and further includes a seat mounted upon the rear portion of the frame; and also includes a drive assembly including axle members being attached to the frame and also including a ski assembly being removably mounted to the steering assembly and further including a track assembly being mounted to the axle members.

7 Claims, 3 Drawing Sheets

CONVERTIBLE SNOW CYCLE/BICYCLE APPARATUS

BACKGROUND OF THE INVENTION

1. Field of the Invention

The present invention relates to convertible snow and dry land vehicle and more particularly pertains to a new convertible snow cycle/bicycle apparatus for providing a vehicle which can be used all year long.

2. Description of the Prior Art

The use of convertible snow and dry land vehicle is known in the prior art. More specifically, convertible snow and dry land vehicle heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,738,361; 1,221,898; 5,102,153; 5,423,559; 3,412,821; and U.S. Pat. No. Des. 329,625 .

While these devices fulfill their respective, particular objectives and requirements, the aforementioned patents do not disclose a new convertible snow cycle/bicycle apparatus. The inventive device includes a frame including a front portion and a rear portion; and also includes a steering assembly being attached to the front portion of the frame; and further includes a seat mounted upon the rear portion of the frame; and also includes a drive assembly including axle members being attached to the frame and also including a ski assembly being removably mounted to the steering assembly and further including a track assembly being mounted to the axle members.

In these respects, the convertible snow cycle/bicycle apparatus according to the present invention substantially departs from the conventional concepts and designs of the prior art, and in so doing provides an apparatus primarily developed for the purpose of providing a vehicle which can be used all year long.

SUMMARY OF THE INVENTION

In view of the, foregoing disadvantages inherent in the known types of convertible snow and dry land vehicle now present in the prior art, the present invention provides a new convertible snow cycle/bicycle apparatus construction wherein the same can be utilized for providing a vehicle which can be used all year long.

The general purpose of the present invention, which will be described subsequently in greater detail, is to provide a new convertible snow cycle/bicycle apparatus which has many of the advantages of the convertible snow and dry land vehicle mentioned heretofore and many novel features that result in a new convertible snow cycle/bicycle apparatus which is not anticipated, rendered obvious, suggested, or even implied by any of the prior art convertible snow and dry land vehicle, either alone or in any combination thereof.

To attain this, the present invention generally comprises a frame including a front portion and a rear portion; and also includes a steering assembly being attached to the front portion of the frame; and further includes a seat mounted upon the rear portion of the frame; and also includes a drive assembly including axle members being attached to the frame and also including a ski assembly being removably mounted to the steering assembly and further including a track assembly being mounted to the axle members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new convertible snow cycle/bicycle apparatus which has many of the advantages of the convertible snow and dry land vehicle mentioned heretofore and many novel features that result in a new convertible snow cycle/bicycle apparatus which is not anticipated, rendered obvious, suggested, or even implied by any of the prior art convertible snow and dry land vehicle, either alone or in any combination thereof.

It is another object of the present invention to provide a new convertible snow cycle/bicycle apparatus which may be easily and efficiently manufactured and marketed.

It is a further object of the present invention to provide a new convertible snow cycle/bicycle apparatus which is of a durable and reliable construction.

An even further object of the present invention is to provide a new convertible snow cycle/bicycle apparatus which is susceptible of a low cost of manufacture with regard to both materials and labor, and which accordingly is then susceptible of low prices of sale to the consuming public, thereby making such convertible snow cycle/bicycle apparatus economically available to the buying public.

Still yet another object of the present invention is to provide a new convertible snow cycle/bicycle apparatus which provides in the apparatuses and methods of the prior art some of the advantages thereof, while simultaneously overcoming some of the disadvantages normally associated therewith.

Still another object of the present invention is to provide a new convertible snow cycle/bicycle apparatus for providing a vehicle which can be used all year long.

Yet another object of the present invention is to provide a new convertible snow cycle/bicycle apparatus which includes a frame including a front portion and a rear portion; and also includes a steering assembly being attached to the front portion of the frame; and further includes a seat mounted upon the rear portion of the frame; and also includes a drive assembly including axle members being attached to the frame and also including a ski assembly being removably mounted to the steering assembly and further including a track assembly being mounted to the axle members.

Still yet another object of the present invention is to provide new convertible snow cycle/bicycle apparatus that is easy and convenient to use.

Even still another object of the present invention is to provide a new convertible snow cycle/bicycle apparatus that provides for transportation on snow and ice as well as on dry land.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
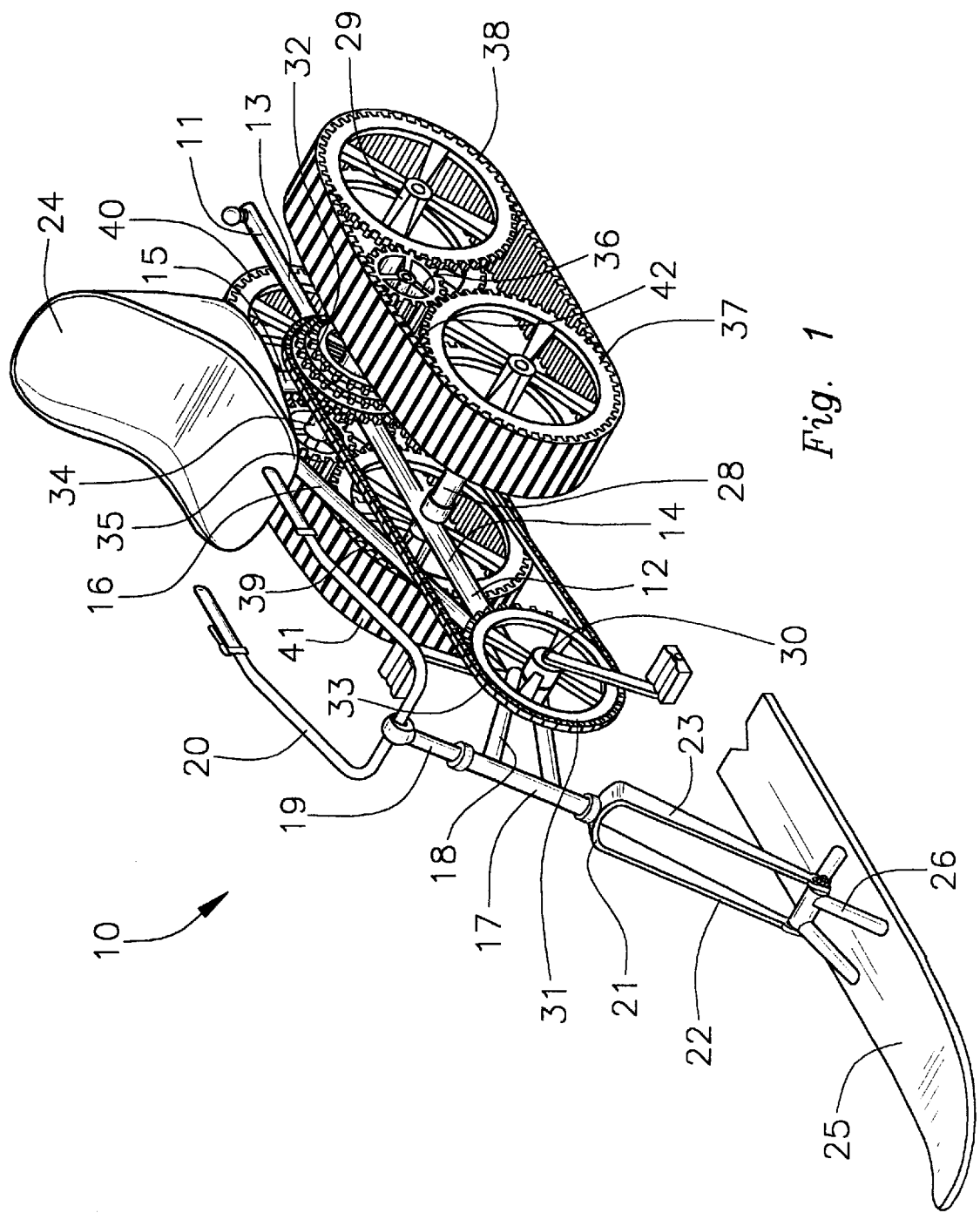
FIG. 1 is a perspective view of a new convertible snow cycle/bicycle apparatus according to the present invention.
Figure 2:
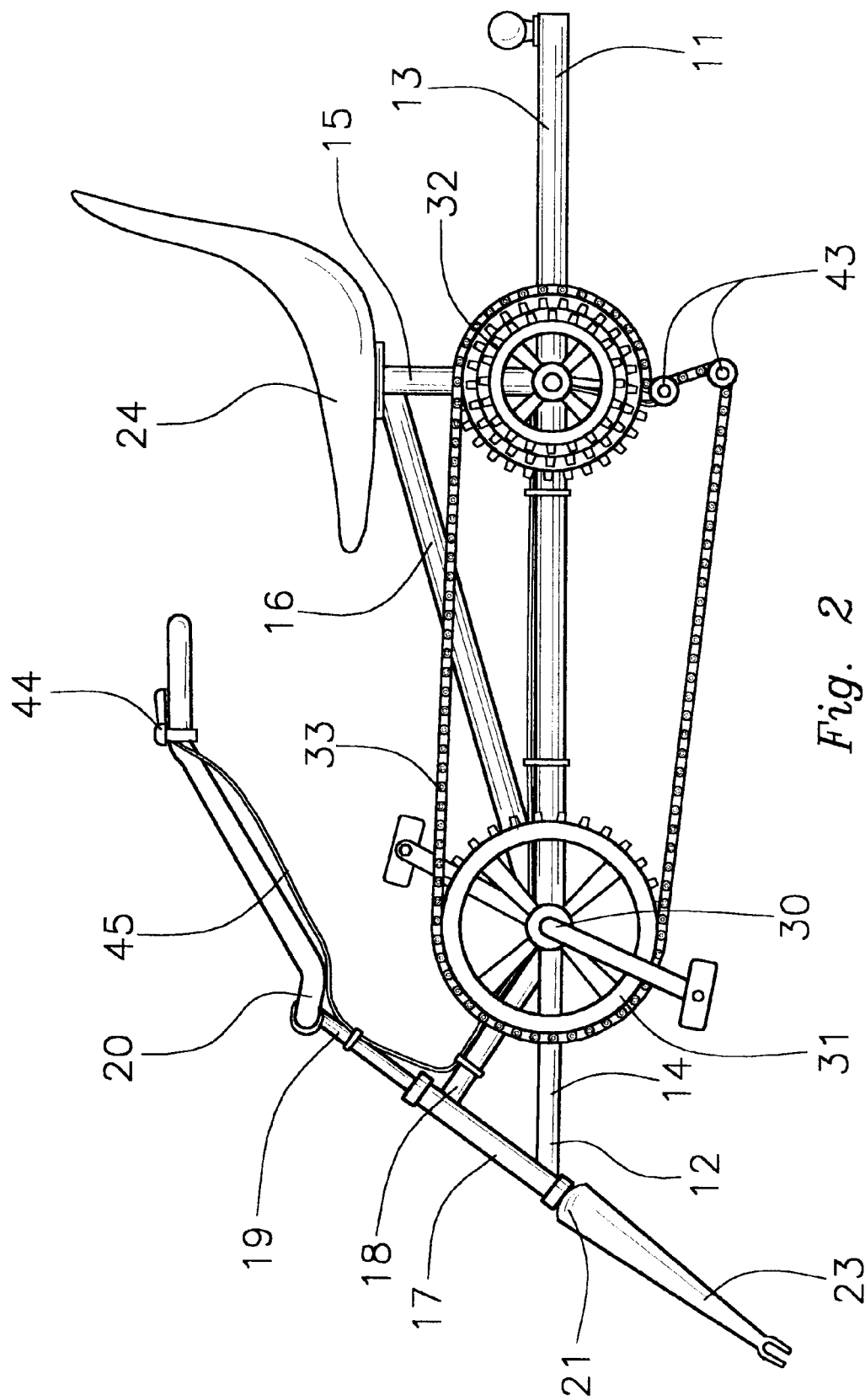
FIG. 2 is a side elevational view of the present invention.
Figure 3:
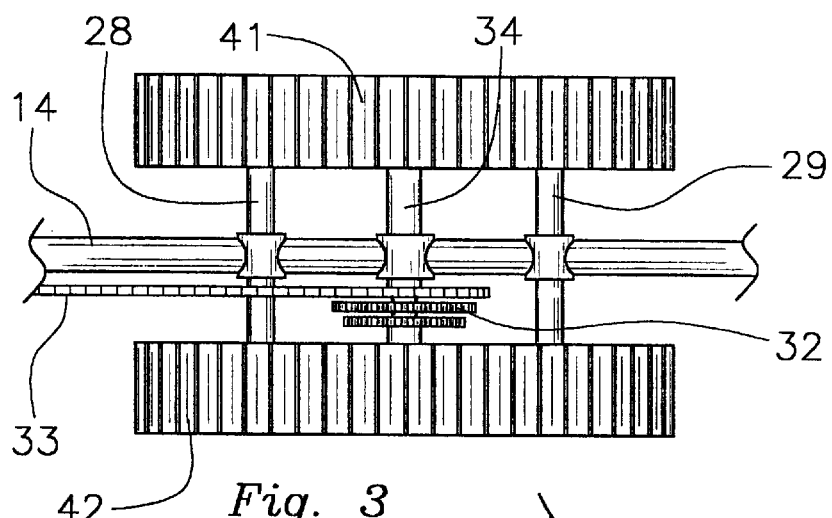
FIG. 3 is a partial bottom plan view of the present invention.
Figure 4:
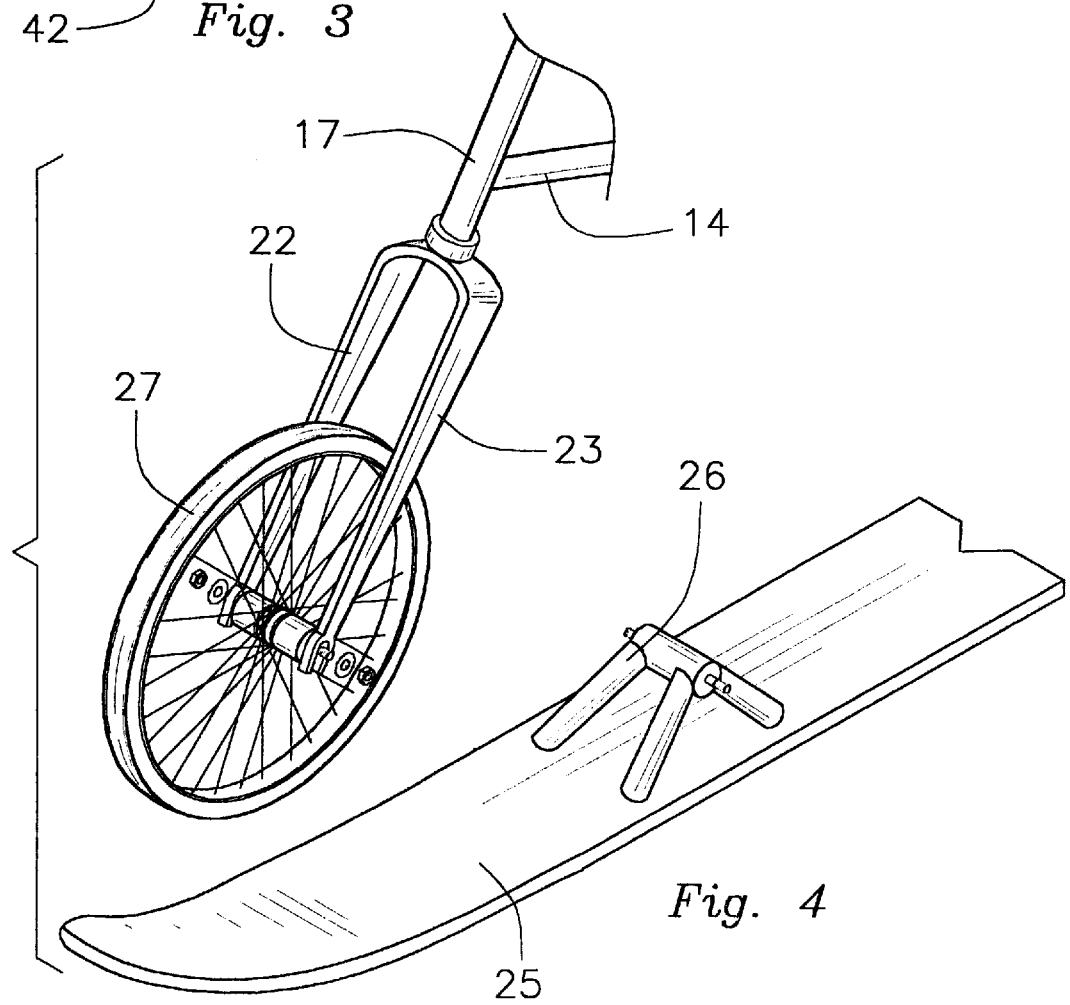
FIG. 4 is a partial exploded perspective view of the present invention.

With reference now to the drawings, and in particular to FIGS. 1 through 4 thereof, a new convertible snow cycle/bicycle apparatus embodying the principles and concepts of the present invention and generally designated by the reference numeral 10 will be described.

As best illustrated in FIGS. 1 through 4, the convertible snow cycle/bicycle apparatus 10 generally comprises a frame 11 including a front portion 12 and a rear portion 13. The frame 11 includes an elongate support member 14, and also includes a seat support member 15 being conventionally attached to the elongate support member 14 and extending upwardly therefrom, and further includes a seat brace member 16 being conventionally attached to the seat support member 15 and to the elongate support member 14, and also includes a tubular steering support member 17 being conventionally attached to the elongate support member 14, and further includes a steering brace member 18 being conventionally attached to the tubular steering support member 17 and to the elongate support member 14.

A steering assembly is attached to the front portion 12 of the frame 11. The steering assembly includes a support shaft 19 rotatably extending through the tubular steering support member 17, and also includes handlebars 20 being conventionally attached to a top of the support shaft 19, and further includes a forked extension member 21 being conventionally attached to a bottom of the support shaft 19 and having a pair of tines 22,23 being spaced apart and extending outwardly relative to the support shaft 19. A seat 24 is conventionally mounted upon the rear portion 13 of the frame 11. The seat 24 is mounted upon the seat support member 15 and is generally a conventional bucket seat.

A drive assembly includes axle members 29, being conventionally attached to the frame 11 and also includes a ski assembly being removably mounted to the steering assembly and further including a track assembly being conventionally mounted to the axle members 28,29. The ski assembly includes a ski 25, and also includes a ski mounting bracket 26 being conventionally attached upon a top of the ski 25 and being adapted to be removably and conventionally mounted at ends of the tines 22,23. The drive assembly further includes a wheel 27 being removably and conventionally mounted at ends of the tines 22,23. The drive assembly further includes a drive shaft 34 being rotatably attached to and disposed perpendicular to the elongate support member 14 of the frame 11, and also includes a plurality of gear sprockets 32 being conventionally mounted about the drive shaft 34, and further includes a pedal assembly 30 being rotatably and conventionally mounted to the frame 11, and also includes a drive sprocket 31 being conventionally mounted to the pedal assembly 30 for rotation therewith, and further includes an endless chain 33 being carried about the drive sprocket 31 and the gear sprockets 32, and also includes drive gears 35,36 being conventionally mounted at ends of the drive shaft 34 for rotation therewith, and further includes a clutch assembly including a clutch member 43 being conventionally mounted to the drive sprockets 32 and also including a lever 44 being conventionally mounted to the steering assembly and being conventionally connected to the clutch member 43 with a cable 45 for changing gears and speed. The track assembly includes sprocket wheels 37–40 being rotatably and conventionally mounted an ends of the axle members 28,29 and being engagable to the drive gears 35,36, and also includes endless belts 41,42 being carried about the sprocket wheels 37–40 for moving the convertible snow cycle/bicycle apparatus 10.

In use, the user would ride the convertible snow cycle/bicycle apparatus 10 just like a three wheeled bicycle by sitting on the seat 24 and pedaling using the pedal assembly 30 which rotates the drive sprocket 31 which, in turn, rotates the gear sprockets 32 which rotates the drive gears 35,36 which rotates the sprocket wheels 37–40 which moves the endless belts 41,42 upon the ground.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A convertible snow cycle/bicycle apparatus comprising:

a frame including a front portion and a rear portion;

a steering assembly being attached to said front portion of said frame;

a seat mounted upon said rear portion of said frame;

a drive assembly including axle members being attached to said frame and also including a ski assembly being removably mounted to said steering assembly and further including a track assembly being mounted to said axle members;

wherein said drive assembly further includes a drive shaft being rotatably attached to and disposed perpendicular to a longitudinal axis of said frame, and also includes a plurality of gear sprockets being mounted about said drive shaft, and further includes a pedal assembly being rotatably mounted to said frame, and also includes a drive sprocket being mounted to said pedal assembly for rotation therewith, and further includes an endless chain being carried about said drive sprocket and said gear sprockets, and also includes drive gears being mounted at ends of said drive shaft for rotation therewith, and further includes a clutch assembly including a clutch member being mounted to said gear sprockets and also including a lever being mounted to said steering assembly and being connected to said clutch member with a cable for changing gears and speed;

said track assembly including sprocket wheels being mounted on ends of each of said axle members and being engagable with a respective drive gear, said track assembly including a pair of endless belts being carried about said sprocket wheels for the purpose of propelling said apparatus.

2. A convertible snow cycle/bicycle apparatus as described in claim 1, wherein said frame includes an elongate support member, and also includes a seat support member being attached to said elongate support member and extending upwardly therefrom, and further includes a seat brace member being attached to said seat support member and to said elongate support member, and also includes a tubular steering support member being attached to said elongate support member, and further includes a steering brace member being attached to said tubular steering support member and to said elongate support member.

3. A convertible snow cycle/bicycle apparatus as described in claim 2, wherein said steering assembly includes a support shaft rotatably extending through said tubular steering support member, and also includes handlebars being attached to a top of said support shaft, and further includes a forked extension member being attached to a bottom of said support shaft and having a pair of tines being spaced apart and extending outwardly relative to said support shaft.

4. A convertible snow cycle/bicycle apparatus as described in claim 3, wherein said ski assembly includes a ski, and also includes a ski mounting bracket being attached upon a top of said ski and being adapted to be removably mounted at ends of said tines.

5. A convertible snow cycle/bicycle apparatus as described in claim 3, wherein said drive assembly further includes a wheel being removably mounted at ends of said tines.

6. A convertible snow cycle/bicycle apparatus as described in claim 2, wherein said seat is mounted upon said seat support member and is generally a bucket seat.

7. A convertible snow cycle/bicycle apparatus comprising:

a frame including a front portion and a rear portion, said frame including an elongate support member, and also including a seat support member being attached to said elongate support member and extending upwardly therefrom, and further including a seat brace member being attached to said seat support member and to said elongate support member, and also including a tubular steering support member being attached to said elongate support member, and further including a steering brace member being attached to said tubular steering support member and to said elongate support member;

a steering assembly being attached to said front portion of said frame, said steering assembly including a support shaft rotatably extending through said tubular steering support member, and also including handlebars being attached to a top of said support shaft, and further including a forked extension member being attached to a bottom of said support shaft and having a pair of tines being spaced apart and extending outwardly relative to said support shaft;

a seat mounted upon said rear portion of said frame, said seat being mounted upon said seat support member and being generally a bucket seat;

a drive assembly including axle members being attached to said frame and also including a ski assembly being removably mounted to said steering assembly and further including a track assembly being mounted to said axle members, said ski assembly including a ski, and also including a ski mounting bracket being attached upon a top of said ski and being adapted to be removably mounted at ends of said tines, said drive assembly further including a wheel being removably mounted at ends of said tines, said drive assembly further including a drive shaft being rotatably attached to and disposed perpendicular to said elongate support member of said frame, and also including a plurality of gear sprockets being mounted about said drive shaft, and further including a pedal assembly being rotatably mounted to said frame, and also including a drive sprocket being mounted to said pedal assembly for rotation therewith, and further including an endless chain being carried about said drive sprocket and said gear sprockets, and also including drive gears being mounted at ends of said drive shaft for rotation therewith, and further including a clutch assembly including a clutch member being mounted to said drive sprockets and also including a lever being mounted to said steering assembly and being connected to said clutch member with a cable for changing gears and speed, said track assembly including sprocket wheels being mounted on ends of each of said axle members and being engagable with a respective drive gear, said track assembly including a pair of endless belts being carried about said sprocket wheels for the purpose of propelling said apparatus.

* * * * *